3,819,808
PROCESS FOR PREPARING LITHIUM BOROHYDRIDE IN AN ETHER SOLUTION COMPRISING LITHIUM ALUMINUM HYDRIDE AND ALUMINUM HYDRIDE

Gerald H. Mattson, Midland, Mich., assignor to Pollution Control Products, Inc.
No Drawing. Filed Dec. 12, 1963, Ser. No. 330,199
Int. Cl. C01b 6/00, 6/14
U.S. Cl. 423—286                              3 Claims

ABSTRACT OF THE DISCLOSURE

The invention is to a method of reacting an ethereal solution of aluminum chloride with an ethereal solution of lithium aluminum hydride and sodium borohydride and recovering an ethereal solution of a product mixture comprising lithium borohydride, lithium aluminum hydride and aluminum hydride. Said product mixture can be used as a reagent in the preparation of high purity, hexagonal crystalline aluminum hydride.

---

This invention relates to a process for preparing a complex light metal hydride and more particularly is concerned with a novel process for preparing lithium borohydride.

Lithium borohydride ($LiBH_4$), of the alkali metal borohydrides, uniquely is used as a reaction promoter in the preparation of aluminum hydride by addition to an ethereal solution of aluminum hydride thereby promoting the recovery of the solid aluminum hydride product in a preferred hexagonal crystalline structure and relatively large particle size as disclosed in copending applications Ser. No. 179,509 of Norman E. Matzek and Donald F. Musinski, filed Mar. 8, 1962 and Ser. No. 234,275 of Donald L. Schmidt and Ronald W. Diesen, filed Oct. 23, 1962. This direct addition of $LiBH_4$ to the ethereal aluminum hydride product solution, as practiced conventionally, has a number of disadvantages. Lithium borohydride is very expensive. To illustrate, this salt costs about twenty times as much as the corresponding sodium borohydride salt. Also, the resulting aluminum hydride product produced by the heretofore practiced direct addition of lithium borohydride to aluminum hydride ether solution consistently has been found to be grey in color; pure aluminum hydride is white. Experience has indicated this off-color in the product apparently results primarily from the presence of impurities in the reaction mass.

Heretofore, a low-cost in process preparation of lithium borohydride for use in promoting aluminum hydride production by reacting lithium chloride with economical sodium borohydride directly in the ethereal reaction solutions of aluminum chloride and lithium aluminum hydride has not been accomplished in that both lithium chloride and sodium borohydride have only a slight solubility in ether solvents. Therefore, the conversion to lithium borohydride and sodium chloride by stirring or mixing lithium chloride and sodium borohydride under such conditions proceeds very slowly at best and usually not at all. Now, unexpectedly the present invention provides a rapid, high yield in process procedure for preparing lithium borohydride in good purity in the presence of an ethereal aluminum chloride-lithium aluminum hydride reaction mixture as well as gives a product solution from which subsequent preparation of a high purity, white hexagonal, crystalline aluminum hydride readily is achieved.

It is a principal object of the present invention to provide a novel process for preparing lithium borohydride for use as a reaction promoter in the production of aluminum hydride.

It is another object of the present invention to provide a novel, economical process for generating lithium borohydride in situ in an ethereal reaction mixture used for preparing aluminum hydride.

It is also an object of the present invention to provide a process for preparing lithium borohydride for use in the preparation of aluminum hydride which process in turn provides a product solution that can lead to the production of a high purity, white aluminum hydride.

These and other objects and advantages readily will become apparent from the detailed description presented hereinafter.

In accordance with the present novel process, sodium borohydride is admixed with lithium aluminum hydride, usually being introduced into an ethereal lithium aluminum hydride solution. Aluminum chloride dissolved in an ether is controllably added to this mixture at a temperature below the boiling point of the ether, usually at about room temperature (i.e. about 18 to about 30° C.) ordinarily over a maximum period of about 1 hour, and usually at from about 10 to about 30 minutes, preferably while the sodium borohydride-lithium aluminum hydride mixture is being agitated. Following the completion of the aluminum chloride addition, solid sodium chloride, lithium chloride and any excess sodium borohydride are separated from the product solution, as by filtration, centrifugation, etc. The filtrate which contains dissolved aluminum hydride, lithium borohydride and lithium aluminum hydride can be used directly for the subsequent preparation of high purity aluminum hydride in a preferred hexagonal crystalline form and desirable white color. By this process, in situ production of lithium borohydride in yields of 75 percent and higher, based on the sodium borohydride reactant, are realized.

The process oridinarily is carried out in an inert atmosphere, e.g. nitrogen, or argon, under substantially anhydrous conditions.

The length of time of reaction is critical only with respect that it not be so long such that precipitation of solid aluminum hydride product begins during the aluminum chloride addition. Ordinarily if the time of adding the aluminum chloride is extended much beyond an hour some aluminum hydride may precipitate along with the sodium chloride and lithium chloride by-products and is lost as this product cannot readily be recovered from the solid waste cake. Aluminum chloride addition times at a maximum of about one hour and ordinarily of less than about 45 minutes are employed. If the addition of the aluminum chloride solution is too rapid, i.e. less than about 10 minutes, low yields of the lithium borohydride product can result.

In the present process, the reactant mixture must contain lithium aluminum hydride in excess of that required for stoichiometric reaction with the aluminum chloride. This is done to assure that there is no excess aluminum chloride which could react with sodium borohydride to form the hazardous material $Al(BH_4)_3$, the vapor of which can explode in air.

The amount of sodium borohydride to be used is such to provide a final solution having a $LiAlH_4/LiBH_4$ gram mole proportion ranging from 1/0.25 to about 1/1, assuming that each gram mole equivalent of $NaBH_4$ is converted into $LiBH_4$. Therefore, the actual amount of sodium borohydride added is the theoretical molar equivalent which provides for the requisite amount of lithium borohydride in the final solution. Ordinarily, finely divided sodium borohydride which has been dried and ground under an inert atmosphere is used. Preferably this material at a maximum is about 100 mesh U.S. Standard sieve.

In this process, the lithium aluminum hydride reactant usually is carried in an ether solution, ordinarily at a concentration of about one molar. This concentration is not critical however, as more dilute or more concentrated ether solutions, or the lithium aluminum hydride reactant itself can be used.

The aluminum chloride reactant also is added in ether solution, usually of about one molar concentration. Prior to its controlled introduction into the reaction mixture ordinarily the aluminum chloride solution is purified, as by agitation with cocoanut charcoal. For best results, this solution is prepared at a reduced temperature, i.e. about 0–10° C.

Ether solvents which are suitable for use in the present process are those materials in which aluminum chloride, lithium borohydride, lithium aluminum hydride and aluminum hydride are soluble. Diethyl ether, propyl ether and the like are ordinarily employed. Diethyl ether is preferred. The diethyl ether ordinarily is redistilled from lithium aluminum hydride prior to use in the present process.

To assure operability all reactants must be substantially anhydrous. Also, generally all reactions and solution preparations are carried out in a substantially anhydrous, inert atmosphere.

Although I do not intend to be bound by any particular theory or hypothesis as to the mode of operation, it is believed that in this novel process, the sodium borohydride reacts with the lithium chloride almost instantaneously as this latter material is formed by reaction of the lithium aluminum hydride with the aluminum chloride in accordance with the following reactions.

(1) 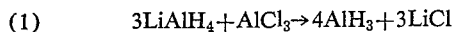

$3LiAlH_4 + AlCl_3 \rightarrow 4AlH_3 + 3LiCl$ (2) 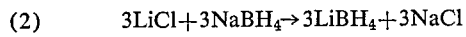

$3LiCl + 3NaBH_4 \rightarrow 3LiBH_4 + 3NaCl$

The following Example will serve to further illustrate the present invention, but is not meant to limit it thereto.

EXAMPLE

About four grams (~0.015 gram mole) of finely divided sodium borohydride was placed in a reaction flask and about 280 milliliters of a 1 molar lithium aluminum hydride (~10.62 grams, i.e. 0.28 gram mole $LiAlH_4$) in diethyl ether solution added at room temperature and atmospheric pressure. The resulting mixture was stirred while about 70 milliliters of $AlCl_3$ (1 molar concentration in diethyl ether solution, i.e. 0.07 gram mole $AlCl_3$) was added from a dropping funnel over a period of from about 20 to about 30 minutes. This provided a reaction mixture wherein the ratio of $AlCl_3/LiAlH_4$ was about 75 percent of that required for stoichiometric reaction between the $LiAlH_4$ and $AlCl_3$ to give $AlH_3$ and LiCl. Following the addition of the aluminum chloride, the solids (primarily lithium chloride, sodium chloride and excess sodium borohydride) were filtered off.

Analysis of the residual solid waste cake both by X-ray diffraction analysis and chemical elemental analysis indicated about 75 percent conversion of the sodium borohydride into lithium borohydride.

The resulting lithium aluminum hydride-aluminum hydride-lithium borohydride solution which had a lithium aluminum hydride/lithium borohydride gram mole proportion of about 1/1.28 was utilized directly in the subsequent production of a white aluminum, hexagonal aluminum hydride of relatively large particle size.

Similar in situ production of lithium borohydride in high yield by this same procedure was realized employing lithium aluminum hydride/sodium borohydride molar proportions ranging from about 1/1 to about 1/0.25.

Various modifications can be employed in the practice of the present invention without departing from the spirit or scope thereof for it is understood that I limit myself only as defined in the appended claims.

I claim:

1. A novel process for preparing an ethereal solution containing lithium aluminum hydride, aluminum hydride and lithium borohydride suitable for use in preparing high purity, hexagonal crystalline aluminum hydride which comprises:

(a) introducing sodium borohydride into an ethereal solution of lithium aluminum hydride in an amount to provide a mixture containing lithium aluminum hydride/sodium borohydride in gram mole proportions ranging from 1/1 to about 1/0.25, the ether solvent for said lithium aluminum hydride being selected from those ethers in which aluminum chloride, lithium borohydride, lithium aluminum hydride and aluminum hydride are soluble, (b) adding an ethereal solution of aluminum chloride to the mixture of said sodium borohydride and said lithium aluminum hydride solution over a maximum period of time of about one hour and at a rate such that substantially no aluminum hydride precipitates in the reaction mixture, the ether solvent for said aluminum chloride being selected from those ethers in which aluminum chloride, lithium borohydride, lithium aluminum hydride and aluminum hydride are soluble, carrying out said aluminum chloride addition at a temperature of from about 18 to about 30° C. and utilizing an amount of aluminum chloride which at a maximum is that required stoichiometrically for reaction with said lithium aluminum hydride in the preparation of aluminum hydride and lithium chloride, (c) physically separating the resulting solid waste cake from the product mass and recovering an ethereal solution containing lithium aluminum hydride, aluminum hydride and lithium borohydride, said solution being suitable for use directly in the preparation of high purity aluminum hydride in hexagonal crystalline form.

2. A novel process for preparing an ethereal solution containing lithium aluminum hydride, aluminum hydride and lithium borohydride suitable for use in preparing high purity, hexagonal crystalline aluminum hydride by reaction of lithium aluminum hydride and aluminum chloride which comprises:

(a) introducing finely divided, substantially anhydrous sodium borohydride into a diethyl ether solution of lithium aluminum hydride in an amount to provide a mixture containing lithium aluminum hydride/sodium borohydride in gram mole proportions ranging from about 1/1 to about 1/0.25, (b) adding at about room temperature and over a period of from about 10 to about 60 minutes a diethyl ether solution of aluminum chloride to the mixture of said sodium borohydride and said lithium aluminum hydride, the total amount of said aluminum chloride at a maximum being that stoichiometrically required for reaction with said lithium aluminum hydride in the preparation of aluminum hydride and lithium chloride, (c) physically separating the resulting solid waste cake containing lithium chloride, sodium chloride and any excess sodium borohydride from the product mass and recovering a diethyl ether solution containing lithium aluminum hydride, aluminum hydride and said lithium borohydride, said solution being suitable for use directly in the preparation of high purity aluminum hydride in hexagonal crystalline form.

3. A novel process for preparing an ethereal solution containing lithium aluminum hydride, aluminum hydride and lithium borohydride suitable for use in preparing high purity, hexagonal crystalline aluminum hydride by reaction of lithium aluminum hydride and aluminum chloride which comprises:

(a) introducing under substantially anhydrous conditions and in an inert atmosphere finely divided, substantially anhydrous sodium borohydride into a substantially anhydrous diethyl ether solution of lithium aluminum hydride in an amount to provide a mixture containing lithium aluminum hydride/sodium borohydride in gram mole proportions of about 1/0.4, (b) adding at about room temperature and over a period of from about 20 to about 30 minutes a substantially anhydrous diethyl ether solution of aluminum chloride to the mixture of said sodium borohydride and said lithium aluminum hydride, the total amount of said aluminum chloride being about 75 percent of that stoichiometrically required for reaction with said lithium aluminum hydride in the preparation of aluminum hydride and lithium chloride, (c) filtering the resulting solid waste cake containing lithium chloride, sodium chloride and any excess sodium borohydride from the product mass and recovering an ethereal solution containing lithium aluminum hydride, aluminum hydride and lithium borohydride, said solution being suitable for use directly in the preparation of high purity aluminum hydride in hexagonal crystalline form.

References Cited

FOREIGN PATENTS 709,891  6/1954  Great Britain ----- 23—14 BH

OTHER REFERENCES

Gaylord: "Reduction With Complex Hydride," Interscience Publishers, New York, 1956, p. 21.

LELAND A. SEBASTIAN, Primary Examiner

U.S. Cl. X.R.

423—644, 645

PO-1050
(5/69)

UNITED STATES PATENT OFFICE
CERTIFICATE OF CORRECTION

Patent No. 3,819,808      Dated June 25, 1974

Inventor(s) Gerald H. Mattson

It is certified that error appears in the above-identified patent and that said Letters Patent are hereby corrected as shown below:

Assignor should read "The Dow Chemical Company"

Column 3, line 38, delete "0.015" and insert --0.105--.

Column 3, line 61, delete "1/1.28" and insert --1/0.28--.

Signed and sealed this 5th day of November 1974.

(SEAL)
Attest:

McCOY M. GIBSON JR.
Attesting Officer

C. MARSHALL DANN
Commissioner of Patents